June 18, 1946.   G. C. THOMPSON   2,402,468
AERIAL AND LAND VEHICLES
Filed Nov. 1, 1943   3 Sheets-Sheet 1
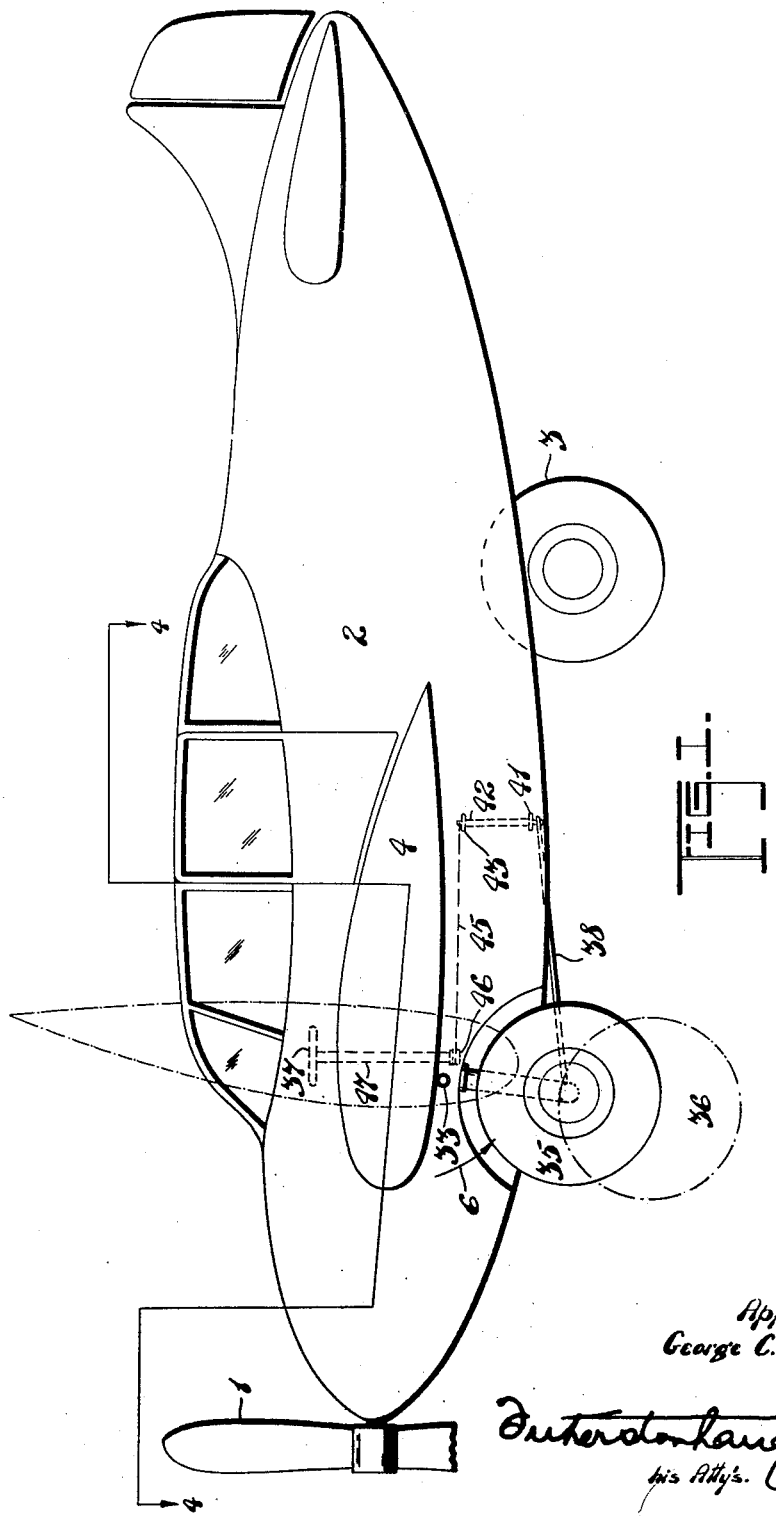
Applicant:
George C. Thompson
his Atty's.

June 18, 1946.　　　G. C. THOMPSON　　　2,402,468
AERIAL AND LAND VEHICLES
Filed Nov. 1, 1943　　　3 Sheets-Sheet 2
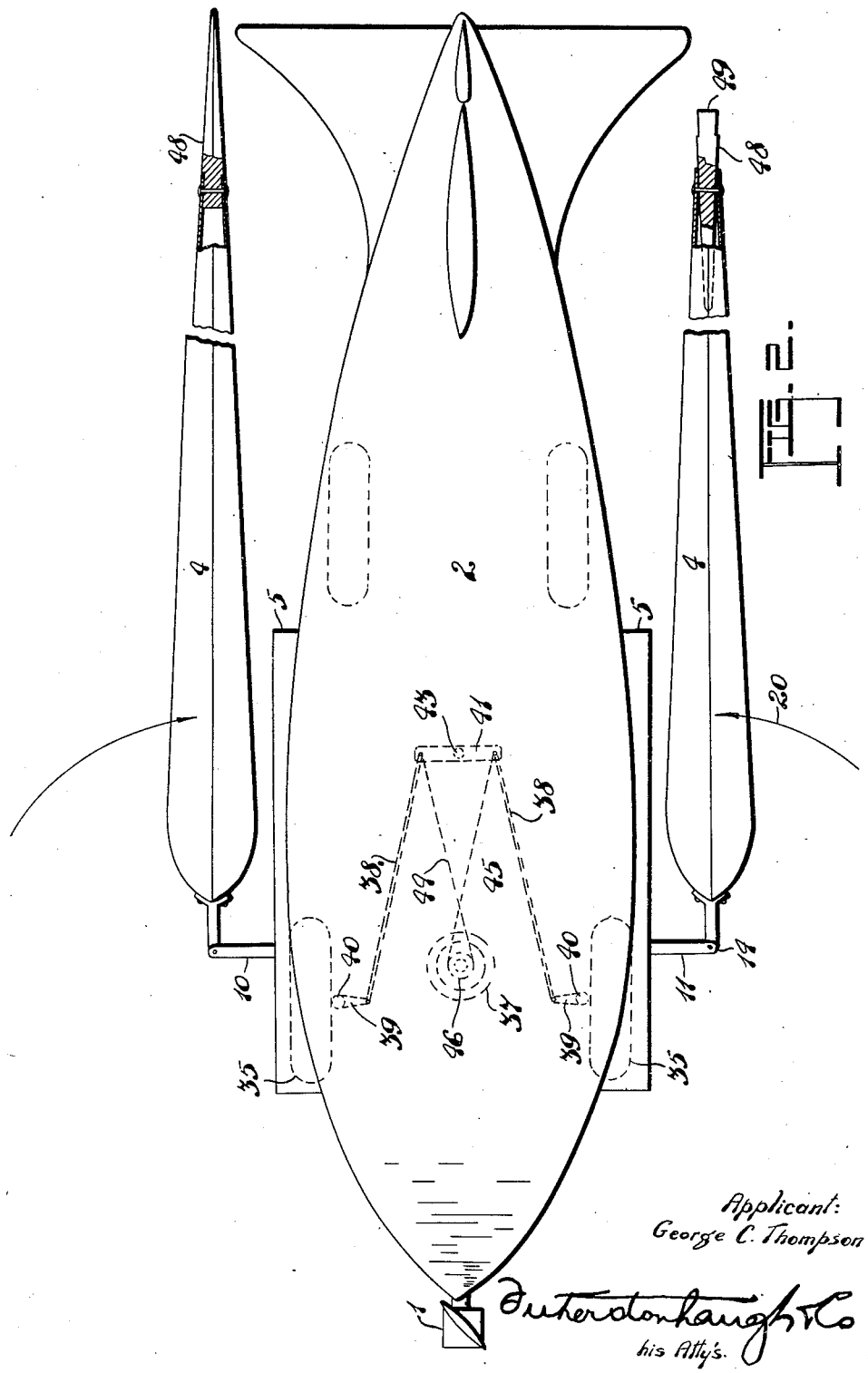
Applicant:
George C. Thompson
his Atty's.

June 18, 1946.  G. C. THOMPSON  2,402,468
AERIAL AND LAND VEHICLES
Filed Nov. 1, 1943  3 Sheets—Sheet 3
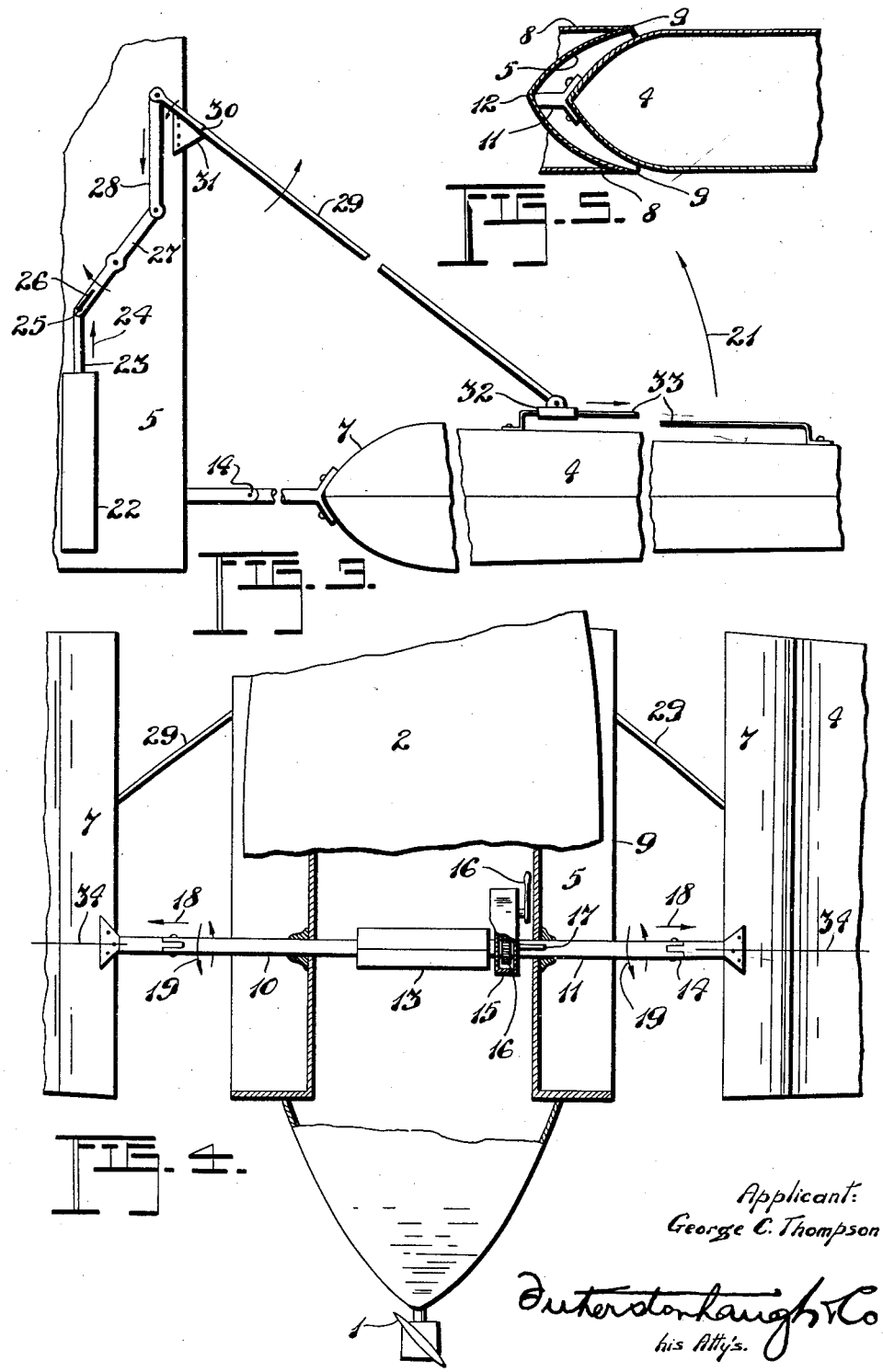

Patented June 18, 1946

2,402,468

UNITED STATES PATENT OFFICE 2,402,468

AERIAL AND LAND VEHICLE

George C. Thompson, Winnipeg, Manitoba, Canada, assignor of fifty per cent to Earnest W. Harrison, Winnipeg, Manitoba, Canada Application November 1, 1943, Serial No. 508,522
In Canada November 2, 1942

6 Claims. (Cl. 244—49)

My invention relates to an aerial and land vehicle, an object thereof being to provide a device of the character herewithin described which may perform the dual function of an automobile and an aeroplane.

In an obvious modification thereof, the automobile turret which I have illustrated might be supplanted by a gun turret, and the vehicle, armoured, in which case also, tank tracks would be substituted for the wheels illustrated. Such a combat vehicle would be most valuable in military operations conducted in conjunction with parachute troops behind enemy lines for instance, and particularly in the obtaining of possession of air fields and the like.

With the above more important objects in view and such other minor objects as may appear as the specification proceeds, my invention consists essentially in the arrangement and construction of parts all as hereinafter more particularly described, reference being had to the accompanying drawings, in which:

Figure 1 is a side elevation of my aerial and road vehicle.

Figure 2 is a plan view of the vehicle of Figure 1, and illustrating the wings angulated rearwardly against the fuselage.

Figure 3 is a fragmentary detail illustrating a wing as seen from the underside of the vehicle, and after same has been projected from the adjacent wing sockets and has been rotated about its longitudinal axis prior to angulation rearwardly against the fuselage of the vehicle.

Figure 4 is a section approximately on the lines 4—4 of Figure 1.

Figure 5 is a fragmentary detail representing a cross-section of a wing and a cross-section of its adjacent wing socket so as to illustrate the configuration of the latter.

In the drawings like characters of reference indicate corresponding parts in the different figures.

For locomotion over land, it is to be understood that my vehicle may be propelled either by means of the propeller 1 or by connecting the conventional engine positioned within the fuselage 2 in the conventional way and place, by means of a drive shaft to the rear wheels 3, and since details of construction are merely within the scope of ability of those engaged in the art to which this invention pertains, further particulars need not be described herein, or the means for coupling and uncoupling the propeller from the engine or the wheels free from the engine when necessary.

The wings 4 are capable of projection from the sockets 5, the sockets being integral with the fuselage 2, and after clearance therefrom, the wings are capable of being rotated through approximately 90 degrees in the direction of the arrow 6 (Figure 1) into the vertical, about the longitudinal axis of the wings. After this movement, the wings are angulated rearwardly to lie alongside the fuselage as clearly illustrated in the plan view Figure 2.

The roots 7 of the wings are preferably streamlined so as to diminish resistance to wind, and to present a minimum of opposing surface to bullets and the like if the invention is modified for combat purposes, this feature of construction being clearly apparent by reference to the plan view Figure 2 and to Figure 5 wherein it will be seen that the wing sockets 5 are of a complementary cross-sectional configuration in respect to their concavity so that the over and under surfaces 8 (see Figure 5) may lie flush and smooth with the adjacent surfaces of the wings, as is necessary in aeronautical design.

In view of the provision of the wing sockets 5, it is necessary to project the wings 4 outwardly, or in other words parallel with the direction of their axis prior to rotating the same, so that the roots thereof will clear the edges 9 of the sockets, and this may be effected, together with the necessary rotation of the wings thereafter, by means of the pair of horizontal, transverse and end-opposed shafts 10 and 11, which extend through the fuselage and through the longitudinal centre line 12 of the wing sockets. The inner ends of these shafts extend into a hydraulic casing 13 of square cross-section, square pistons being secured to the inner ends of the shafts to separate the shafts upon the application of pressure against the opposed surfaces of the pistons.

The shafts 10 and 11 are hinged at 14 so that they may be angulated, and it will be noted that the outer ends of the shafts are secured to the roots 7 of the wings. Upon the shaft 14 is mounted a reduction-gearing assembly 15 suitably housed and including a lever 16 whereby the necessary rotary operation upon the wings may be performed.

The crown gear 16 in the reduction-gearing assembly will be keyed to the shaft 11 which will be provided with the longitudinal keyway 17 so that the shafts 10 and 11 may move outwardly as indicated by the arrows 18 to project the wings as aforesaid, and it is to be understood that the reduction-gearing assembly 15 will be suitably bracketed or secured within the fuselage against movement.

By the provision of a square hydraulic cylinder and square pistons therewithin, it will become apparent that rotation of the shaft 11 by the mechanism described, will rotate the hydraulic casing 13 also, and similarly the shaft 10 and, of course, the opposite wing to which the same is secured.

The wings having been initially projected as described to clear the projecting edges 9, and rotated in the direction of the arrows 6 and 19 (Figures 1 and 4) as also described, the final requirement is the angulation of the wings in the direction of the arrows 20 and 21 (Figures 2 and 3) so that the wings lie alongside the fuselage.

This is accomplished by the hydraulic cylinders 22 and associated linkages illustrated in the accompanying Figure 3, one of the cylinders 22 being secured to the underside of each of the wing sockets 5. The connecting rods 23 move as indicated by the arrows 24, being provided each with a stud 25 at the outer ends thereof engageable with the slot 26 formed in the adjacent end of a centrally fulcrumed lever 27. A link 28 is secured to the opposite end of the lever 27, and the remaining end of the link 28 is in turn secured to the inner end of a radius arm 29, which is fulcrumed at the point 30 on the bracket 31, the radius arms 29 terminating at their outer ends each in a sleeve 32 designed to travel along a bracketed bar 33 secured one on each wing at the location upon the underside breadth thereof best illustrated in the accompanying Figures 1 and 4, in the latter figure by location lines 34 which represent the centerlines of the bracketed bars.

Any additional mechanical expedients may be resorted to for securing the wings rigidly either in their extended or folded back position, such mechanical expedients being merely matters of mechanical skill, and not of patentable invention for which reason the same will not be described in detail.

After alighting, and when it is desired to propel the vehicle on terra firma, the engine may be coupled up through a conventional transmission shaft with the rear wheels 3 as I have already indicated, or the vehicle may be moved by rotation of the propeller as also indicated. Means must be provided however to steer the vehicle, and therefore, after the front wheels 35 have been projected into the position 36 in Figure 1, by conventional hydraulic means, it is to be understood that rotation of the wheels 35 may be effected by rotation of the joystick 37 in a clockwise or counterclockwise direction as is customary in steering automobiles.

The radius rods 38 are pivotally connected at the front ends thereof to links 39 rotating about the stub-shafts 40 and integral with the wheel hub. The rear ends of the radius rods are universally connected to the ends of the cross-arm 41, the cross-arm 41 being rotated by the central post 42 suitably maintained in place by conventional bearings.

At the upper end of the post 42 is a cross-arm 43 similar to the cross-arm 41 to the ends of which are connected cables 44 and 45. These cables are passed around a drum 46 keyed to the lower end of the steering column 47 for rotation therewith, and so, obviously, when the joystick in its capacity as a steering column is rotated clockwise with respect to the accompanying Figure 2, the wheels will be turned to the right, while when rotated counterclockwise, the wheels will be steered left.

Finally, it will be noted that the tip-sections 48 of my wings are detachable, the thick ends thereof being tongued as at 49 to enter the open end of the main wing sections and be secured in the manner illustrated in Figure 2 which also shows one of these tip-sections in stored position, which consists in reversing the tip-sections and thrusting them endwise into the hollow interior of the main sections and securing them by any suitable means such as I have illustrated.

Since many modifications can be made in the invention herein described and since the accompanying drawings have been prepared only to illustrate the relative arrangement and interaction of parts and not with regard to accuracy of dimensions for manufacturing purposes which in view of this disclosure I consider to entail merely mechanical skill together with the skill of the mechanical draftsman, and since many apparently widely different embodiments of this invention may be made within the scope of the accompanying claims without departing from the spirit and scope of the same it is intended that all matter contained in the accompanying specification shall be interpreted as illustrative only and not in a limiting sense and I desire only such limitations placed thereon as justice dictates.

What I claim as my invention is:

1. An aerial and land vehicle comprising a fuselage or body having wheels and rotatable and foldable wings connected thereto, an elongated wing socket extending substantially parallel with the axis of said fuselage or body on either side thereof, the roots of said wings being positioned in said sockets when in flying position only, means for sustaining said wings in said sockets while the vehicle is in flight, means for outwardly end-shifting said wings from the perimeter of said sockets, means for rotating said wings after such outward end shifting, and means for folding said wings to lie alongside said fuselage or body for overland travel.

2. An aerial and land vehicle comprising a fuselage or body having wheels and rotatable and foldable wings attached thereto, an elongated wing socket extending substantially parallel with the axis of said fuselage or body on either side thereof, said sockets being transversely concave, the roots of said wings being complementarily convex and being positioned in said sockets when in flying position only, means for sustaining said wings in said sockets while the vehicle is in flight, means for outwardly end-shifting said wings from the perimeter of said sockets, means for rotating said wings after such outward end shifting, and means for folding said wings to lie alongside said fuselage or body for overland travel.

3. An aerial and land vehicle comprising a fuselage or body having wheels and rotatable and foldable wings attached thereto, an elongated wing socket extending substantially parallel with the axis of said fuselage or body on either side thereof, said sockets being transversely concave, the roots of said wings being complementarily convex, said wings being attached to said fuselage or body as aforesaid at a point upon the centerline plane of said sockets and between the longitudinal central axes and the leading edges thereof, the roots of said wings being positioned in said sockets when in flying position only, means for sustaining said wings in said sockets while the vehicle is in flight, means for outwardly end-shifting said wings from the perimeter of said sockets, means for rotating said wings after such outward end shifting, and means for folding said wings to lie alongside said fuselage or body for overland travel.

4. An aerial and land vehicle comprising a fuselage or body having wings and wheels, means for rotating said wings while extended, and means for folding said wings after rotation to lie alongside the fuselage or body, said latter means comprising an elongated bracketed bar upon the undersurface of each wing, a sliding sleeve on said bar, a radius rod rotatably attached to said sleeve at one end thereof, said rod being pivoted on a stationary fixture medially of its length, and means for swinging said rod for the purpose aforesaid.

5. An aerial and land vehicle comprising a fuselage or body having wings and wheels, means for rotating said wings while extended, and means for folding said wings after rotation to lie alongside the fuselage or body, said latter means comprising an elongated bracketed bar upon the undersurface of each wing, a sliding sleeve on said bar, a radius rod attached to said sleeve at the outer end thereof, said rod being pivoted on a stationary fixture medially of its length, a link pivotally attached to the inner end of said rod at one end thereof, a lever of the first order connected at one end thereof to the remaining end of said link, and a source of power connected to the other end of said lever for swinging said rod through the intermediacy of said lever and said link for the purpose aforesaid.

6. An aerial and land vehicle comprising a fuselage or body having wheels and rotatably and foldably attached wings, an elongated wing socket extending substantially parallel with the axis of said fuselage or body on either side thereof, the roots of said wings being positioned in said sockets when in flying position only, means for outwardly end-shifting said wings from the perimeter of said sockets prior to rotating the same, and means for folding said wings after rotation to lie alongside the fuselage or body, said latter means comprising an elongated bracketed bar upon the undersurface of each wing, a sliding sleeve on said bar, a radius rod rotatably attached to said sleeve at one end thereof, said rod being pivoted on a stationary fixture medially of its length, and means for swinging said rod for the purpose aforesaid.

GEORGE C. THOMPSON.